(12) United States Patent
Dai et al.

(10) Patent No.: US 10,282,031 B2
(45) Date of Patent: May 7, 2019

(54) METHOD AND DEVICE FOR RESTRAINING EDGE TOUCHES

(71) Applicant: Beijing Xiaomi Mobile Software Co., Ltd., Haidian District, Beijing (CN)

(72) Inventors: Lin Dai, Beijing (CN); Peng Zhang, Beijing (CN); Dawei Xiong, Beijing (CN)

(73) Assignee: Beijing Xiaomi Mobile Software Co., Ltd, Beijing (CN)

( * ) Notice: Subject to any disclaimer, the term of this patent is extended or adjusted under 35 U.S.C. 154(b) by 0 days.

(21) Appl. No.: 15/785,978

(22) Filed: Oct. 17, 2017

(65) Prior Publication Data
US 2018/0107339 A1 Apr. 19, 2018

(30) Foreign Application Priority Data
Oct. 17, 2016 (CN) .......................... 2016 1 0902435

(51) Int. Cl.
*G06F 3/041* (2006.01)
*G02F 1/1333* (2006.01)
(Continued)

(52) U.S. Cl.
CPC ........ *G06F 3/0418* (2013.01); *G02F 1/13338* (2013.01); *G06F 3/017* (2013.01);
(Continued)

(58) Field of Classification Search
CPC ..... G02F 1/13338; G06F 3/017; G06F 3/0412
See application file for complete search history.

(56) References Cited

U.S. PATENT DOCUMENTS

2010/0085317 A1 4/2010 Park et al.
2011/0285645 A1* 11/2011 Cho ...................... G06F 3/0416
345/173
(Continued)

FOREIGN PATENT DOCUMENTS

CN 104536685 A 4/2015
CN 105183235 A 12/2015
(Continued)

OTHER PUBLICATIONS

Extended European Search Report issued in corresponding European Application No. 17196639.3, dated Feb. 16, 2018, 8 pages.
(Continued)

*Primary Examiner* — Chun-Nan Lin
(74) *Attorney, Agent, or Firm* — Arch & Lake LLP (57) ABSTRACT

A method and a device for restraining edge touches are provided. The device acquires locations of one or more touch points sensed by a terminal at two edges of a screen of the terminal. The device determines a holding manner indicating how the terminal is held according to the locations of the one or more touch points. When the holding manner is a single-hand holding manner indicating that the terminal is held by a single hand, the device determines to trigger a touch restraining detection in a restraining region at one edge of the screen corresponding to the single-hand holding manner, such that touch points sensed within the restraining region do not trigger the terminal to respond to operations input by a user.

17 Claims, 6 Drawing Sheets

(51) Int. Cl.
  *G06F 3/01* (2006.01)
  *G06F 3/044* (2006.01)
  *G06F 3/0488* (2013.01)
(52) U.S. Cl.
  CPC ............ *G06F 3/044* (2013.01); *G06F 3/0412* (2013.01); *G06F 3/0414* (2013.01); *G06F 3/0488* (2013.01)

(56) References Cited

U.S. PATENT DOCUMENTS

| | | | | |
|---|---|---|---|---|
| 2012/0129496 | A1* | 5/2012 | Park | G06F 3/0488 455/411 |
| 2012/0154294 | A1* | 6/2012 | Hinckley | G06F 1/1649 345/173 |
| 2012/0287076 | A1* | 11/2012 | Dao | G06F 1/1626 345/174 |
| 2013/0285963 | A1 | 10/2013 | Park et al. | |
| 2014/0289655 | A1 | 9/2014 | Park et al. | |
| 2015/0355821 | A1 | 12/2015 | Park et al. | |
| 2016/0070403 | A1* | 3/2016 | Sharma | G04G 21/08 345/174 |
| 2016/0179288 | A1 | 6/2016 | Iida et al. | |
| 2016/0283053 | A1 | 6/2016 | Shi | |

FOREIGN PATENT DOCUMENTS

| | | |
|---|---|---|
| CN | 105474141 A | 4/2016 |
| WO | 2014155696 A1 | 10/2014 |

OTHER PUBLICATIONS

Chinese Office Action (including English translation) issued in corresponding CN Patent Application No. CN201610902435.4, dated Aug. 31, 2018, 14 pages.

* cited by examiner

METHOD AND DEVICE FOR RESTRAINING EDGE TOUCHES

CROSS REFERENCE TO RELATED APPLICATION

This application is based upon and claims a priority to Chinese Patent Application Serial No. 201610902435.4, filed with the Status Intellectual Property Office of P. R. China on Oct. 17, 2016, the entire contents of which are incorporated herein by reference.

TECHNICAL FIELD

The present disclosure relates to the communication field, and more particularly, to a method and a device for restraining edge touches.

BACKGROUND

At present, phones have become general in daily life. In various scenarios, it requires a user to operate a phone with a single hand. In general, a screen of the phone is touched by a thumb. For example, when the user travels by bus, the thumb generally may swipe the screen to turn pages when the phone is operated by the single hand for reading an e-book. However, as other fingers may hold the phone, undesired operations may be resulted from touches of the screen via the other fingers.

SUMMARY

According to a first aspect of the present disclosure, there is provided a method for restraining edge touches. The method includes: acquiring locations of one or more touch points sensed by a terminal at two edges of a screen of the terminal; determining a holding manner indicating how the terminal is held according to the locations of the one or more touch points; and when the holding manner is a single-hand holding manner indicating that the terminal is held by a single hand, determining to trigger a touch restraining detection in a restraining region at one edge of the screen corresponding to the single-hand holding manner, such that touch points sensed within the restraining region do not trigger the terminal to respond to operations input by a user.

According to a second aspect of the present disclosure, there is provided an apparatus for restraining edge touches. The apparatus includes: a processor; and a memory configured to store an instruction executable by the processor. The processor is configured to: acquire locations of one or more touch points sensed by a terminal at two edges of a screen of the terminal; determine a holding manner indicating how the terminal is held according to the locations of the one or more touch points; and when the holding manner is a single-hand holding manner indicating that the terminal is held by a single hand, determine to trigger a touch restraining detection in a restraining region at one edge of the screen corresponding to the single-hand holding manner, such that touch points sensed within the restraining region are treated differently compared to touch points sensed within regions other than the restraining region.

According to a third aspect of the present disclosure, there is provided a non-transitory computer-readable storage medium having stored therein instructions that, when executed by a processor of a terminal, causes the terminal to perform acts including: acquiring locations of one or more touch points sensed by a terminal at two edges of a screen of the terminal; determining a holding manner indicating how the terminal is held according to the locations of the one or more touch points; and when the holding manner is a single-hand holding manner indicating that the terminal is held by a single hand, determining to trigger a touch restraining detection in a restraining region at one edge of the screen corresponding to the single-hand holding manner, such that touch points sensed within the restraining region do not trigger the terminal to respond to operations input by a user.

It is to be understood that, both the foregoing general description and the following detailed description are exemplary and explanatory only and are not restrictive of the present disclosure.

BRIEF DESCRIPTION OF THE DRAWINGS

The accompanying drawings herein are incorporated in and become parts of the specification, illustrate embodiments consistent with the disclosure and, together with the description, serve to explain the principles of the disclosure.

DETAILED DESCRIPTION

Descriptions will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the disclosure. Instead, they are merely examples of devices and methods consistent with aspects related to the disclosure as recited in the appended claims.

One of the technical problems the disclosure is trying to solve is avoiding undesired touch inputs from fingers holding the edge of the touch screen. For example, when the user is holding a touch screen device with one hand, the supporting fingers are not intended to be used to trigger touch inputs. When the supporting fingers accidentally touches the touch screen, the touch screen needs to ignore those undesired inputs by triggering a touch restraining detection mode in a portion of the touch screen.

Figure 1:
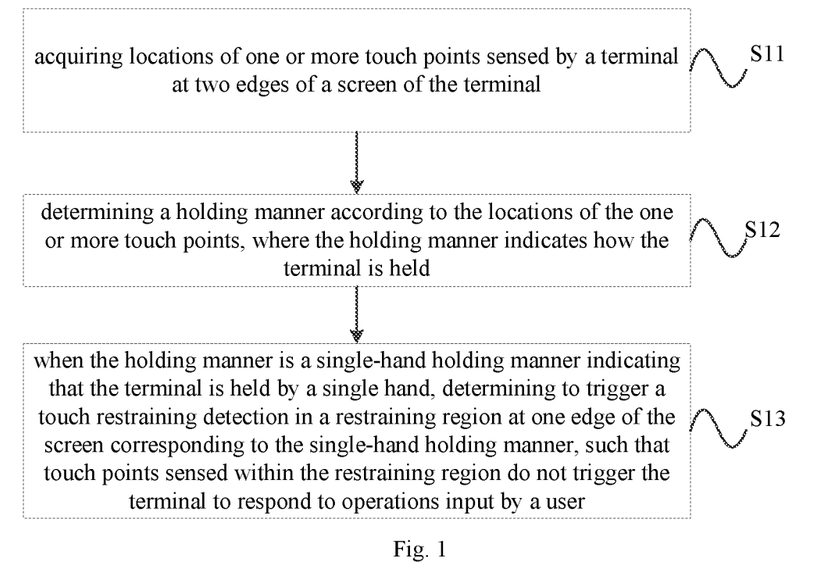
FIG. 1 is a flow chart illustrating a method for restraining edge touches according to an aspect of the disclosure.

FIG. 1 is a flow chart illustrating a method for restraining edge touches according to an aspect of the disclosure. Referring to FIG. 1, the method may be applied to a terminal and the method includes followings. The terminal may include a touch screen and a plurality of sensors disposed on edges of the touch screen.

At act S11, locations of one or more touch points sensed by the terminal at two edges of a screen of the terminal are acquired. For example, the device may acquire the locations of the one or more touch points when determining whether to trigger a touch restraining detection.

In an embodiment, when it is determined by the terminal to trigger the touch restraining detection, the terminal starts a touch restraining detecting function. The terminal starts to detect the location of the touch points at the edges of the screen. Specifically, a touch point may be caused by a finger contacting an edge of the screen. Sometimes, the touch point may also be referred to as the contact point. Temperature sensors, capacitance sensors, or other sensors may be arranged at the edges of the terminal to sense the locations of the touch points at the edges of the screen.

At act S12, a holding manner indicating how the terminal is held is determined according to the locations of the one or more touch points.

In an embodiment, the holding manner may be determined according to the locations of the touch points. For example, according to common rules, when the terminal is held via two hands by the user, there may be more than one touch point sensed at either edge of the screen. When the terminal is held via a single hand, a thumb may be placed at one edge of the terminal. Therefore, only one touch point is sensed at one edge of the terminal, and one or more touch points are sensed at another edge of the terminal. Furthermore, according to the locations of the touch points, it may be determined whether the terminal is held by a single right hand or a single left hand. Therefore, according to predetermined rules, the holding manner indicating how the terminal is held may be determined according to the locations of the touch points. The predetermined rules At act S313, when it is determined that the holding manner is a single-hand holding manner indicating the terminal is held by a single hand, a restraining region is determined at one edge of the screen corresponding to the single-hand holding manner, the terminal then triggers a touch restraining detection in the restraining region such that touch points sensed within the restraining region do not trigger the terminal to respond to operations input by a user. Alternatively or additionally, the terminal may adjust how the terminal responds to the touch inputs in the restraining region so that unintentional touches inputs are treated differently from touch inputs in regions other than the restraining region. For instance, the terminal may lower the sensitivity of the restraining region so that unintentional touches with short duration in the restraining region are ignored.

In one or more embodiments, when it is determined that the holding manner is the single-hand holding manner according to the locations of the one or more touch points, the restraining region at one edge of the screen corresponding to the single-hand holding manner is determined. The terminal may trigger a touch restraining detection in the restraining region such that the touch points sensed by the terminal within the restraining region do not trigger the terminal to respond to the operations input by the user. For example, when the holding manner is a right-hand holding manner indicating that the terminal is held by a single right hand, only one touch point is sensed at the right edge of the screen while at least two touch points are sensed at the left edge of the screen. Therefore, corresponding to the right-hand holding manner, the restraining region is determined proximate to the left edge of the screen. The terminal may trigger a touch restraining detection in the restraining region to prevent the terminal from responding to undesired operations due to touching the screen via other fingers except for the thumb.

Here, the method for restraining edge touches according to embodiments are mostly suitable for the terminal in a portrait mode. In general, when the terminal is in a landscape mode, it is unlikely to hold the terminal via one hand. Therefore, the method may be less likely to be applied to the terminal in the landscape mode. However, the present disclosure is not limited to apply the method to the terminal in the portrait mode.

With the method for restraining edge touches according to embodiments of the present disclosure, when it is determined to trigger the touch restraining detection, the locations of the one or more touch points sensed by the terminal at the two edges of the screen are acquired. The holding manner indicating how the terminal is held is determined according to the locations of the one or more touch points. The restraining region is determined at one edge of the screen corresponding to the single-hand holding manner when the holding manner is determined to be the single-hand holding manner, such that the touch points within the restraining region do not trigger the terminal to respond to the operations input by the user. When the terminal is held via the single hand, by determining the restraining region at one edge of the screen corresponding to the single-hand holding manner, it may prevent the terminal from responding to undesired operations due to touching the screen via other fingers except for the thumb.

Alternatively, on the basis of embodiments illustrated as FIG. 1, acquiring the locations of the one or more touch points sensed by the terminal at the two edges of the screen of the terminal includes followings. The locations of the one or more touch points at the two edges of the screen are sensed via temperature sensors arranged at the two edges of the screen.

Figure 2:
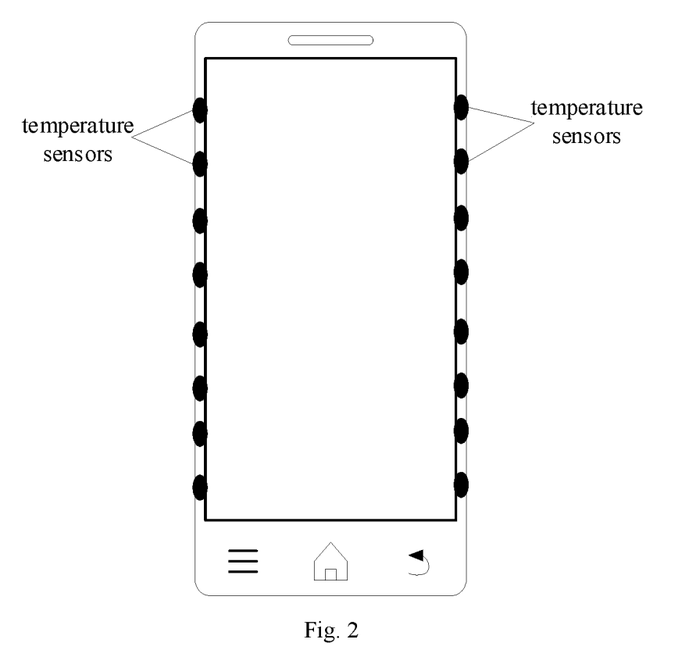
FIG. 2 is a schematic diagram illustrating a terminal according to an aspect of the disclosure.
Figure 3:
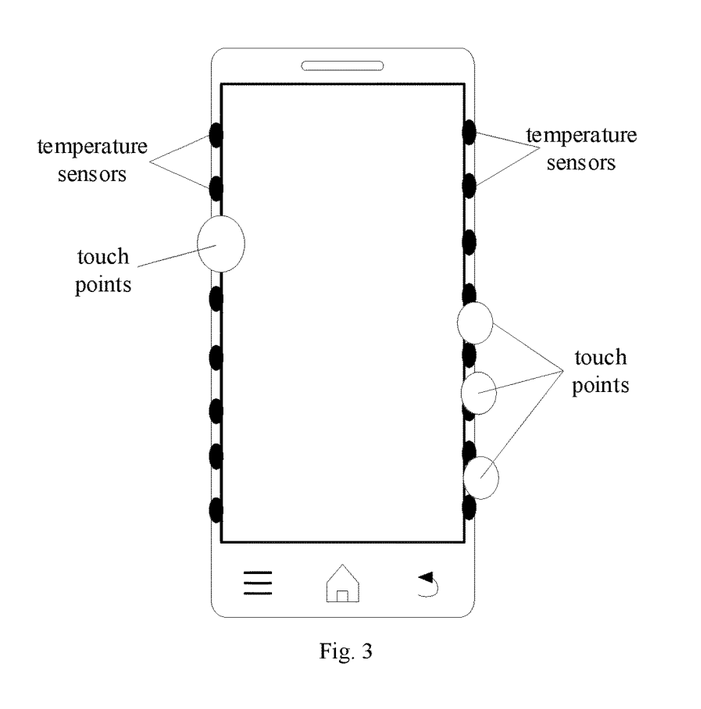
FIG. 3 is a schematic diagram illustrating a terminal according to another aspect of the disclosure.

In an embodiment, the temperature sensors are arranged at edges of the terminal. As illustrated in FIG. 2, a plurality of temperature sensors are arranged at both the left and the right edges of the terminal. By detecting temperature of fingers via the temperature sensors, the locations of the one or more touch points are sensed. For example, as the temperature of a human ranges normally from 36 degree centigrade to 38 degree centigrade, when the temperature sensed by a temperature sensor is in a range from 36 degree centigrade to 38 degree centigrade, it may be determined that the temperature sensed by the temperature sensor is of the fingers so as to determine the locations of the one or more touch points. As illustrated in FIG. 3, certain locations of the touch points caused by the thumb and other fingers may be determined according to the sensed temperature. The holding manner may be determined according to the locations of the touch points. For example, according to the locations of the touch points illustrated in FIG. 3, it is determined that the holding manner is the single-hand holding manner and it may be further determined that the single-hand holding manner is a left-hand holding manner indicating that the terminal is held by a single left hand.

With the method for restraining edge touches according to embodiments of the present disclosure, the locations of the one or more touch points at the two edges of the screen are sensed via the temperature sensors arranged at the two edges of the terminal. Since the temperature sensors are developed enough, by sensing the locations of the one or more touch points at the two edges of the screen via the temperature sensors, not only the locations are acquired quickly, but also it is easy to implement and cost is low.

Alternatively, determining the holding manner according to the locations of the one or more touch points includes followings. When one touch point is sensed at a first edge of the screen while at least two touch points are sensed at a second edge of the screen, it is determined that the holding manner is the single-hand holding manner.

Figure 4:
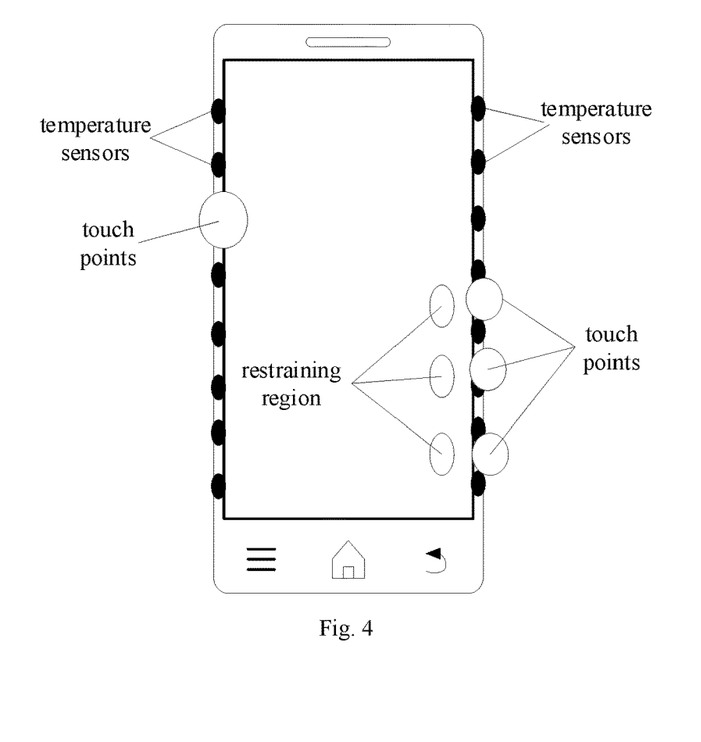
FIG. 4 is schematic diagram illustrating a terminal according to another aspect of the disclosure.

As illustrated in FIG. 3, one touch point is sensed at the left edge of the terminal (the left edge is the first edge), while three touch points are sensed at the right edge of the terminal (the right edge is the second edge). According to the locations of the touch points, it may be determined that the holding manner is the single-hand holding manner. Thus, the restraining region at one edge of the screen corresponding to the single-hand holding manner is determined. As illustrated in FIG. 4, the restraining region is determined proximate to the locations of the touch points caused by other fingers except for the thumb. Therefore, when the other fingers except for the thumb touch the screen within the restraining region, the terminal do not respond to that so as to avoid undesired operations. The restraining region may include separate regions as illustrated in FIG. 4, or the restraining region may be an integral region including three separate regions as illustrated in FIG. 4, which is not limited in embodiments of the present disclosure.

With the method for restraining edge touches according to embodiments of the present disclosure, if one touch point is sensed at the first edge of the screen and at least two touch points are sensed at the second edge of the screen, it is determined that the holding manner is the single-hand holding manner. The method is simple and is easy to implement, thus to quickly determine the holding manner.

Figure 5:
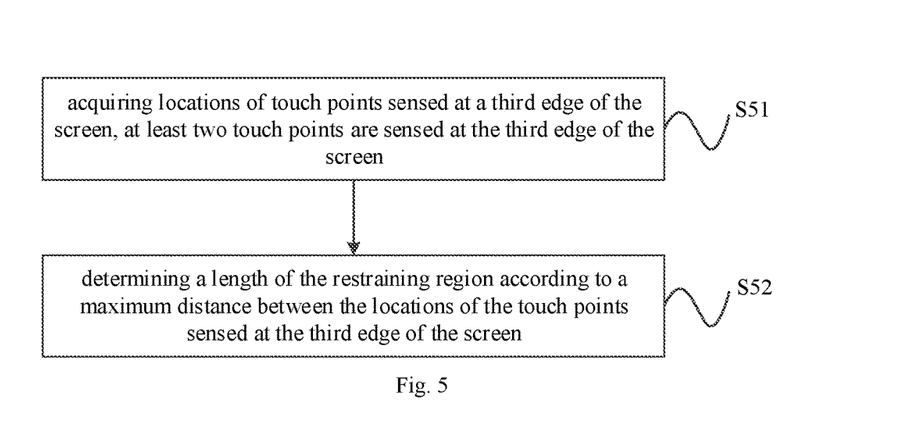
FIG. 5 is a flow chart illustrating a method for restraining edge touches according to another aspect of the disclosure.

FIG. 5 is a flow chart illustrating a method for restraining edge touches according to another aspect of the disclosure. The method is applied to a terminal. On the basis of the embodiments illustrated as FIG. 1, illustrated as FIG. 5, determining the restraining region at the one edge of the screen corresponding to the single-hand holding manner includes followings.

At act S51, locations of touch points sensed at a restraining edge of the screen are acquired. At least two touch points are sensed at the restraining edge of the screen. The restraining edge may be one of the two edges of the screen, which are equipped with sensors to sense the touch points.

In an embodiment, in order to avoid undesired operations caused by other fingers except for the thumb, it is required to determine the restraining region proximate to an edge at which at least two touch points are sensed. Therefore, the locations of the touch points sensed at the restraining edge of the screen are acquired, and at least two touch points are sensed at the restraining edge. As illustrated in FIG. 4, the right edge of the terminal is determined as the restraining edge.

At act S52, a length of the restraining region is determined according to a maximum distance between the locations of the touch points sensed at the restraining edge of the screen. The maximum distance may be the distance between the top location and the bottom location of the touch points.

In one or more embodiments, the length of the restraining region may be determined by the terminal according to the maximum distance between the locations of the touch points sensed at the restraining edge of the screen or a center point of a length of the restraining region may be set by the terminal. Thus, a location and a size of the restraining region may be updated according to the locations of the touch points, thereby preventing the undesired operations more flexibly. As illustrated in FIG. 4, the terminal may determine the length of the restraining region according to the distance between a topmost touch point and a bottommost touch point sensed at the right edge of the screen, thereby ensuring an effective prevention of undesired operations caused by other fingers except for the thumb. A width of the restraining region may be a defaulted value, for example, the width of the restraining region may be 0.3 cm, which is not limited in embodiments of the present disclosure. An area of the restraining region may be determined according to the length and the width. When the other fingers except the thumb holds at the edges of screen, corresponding touch points sensed within the restraining region are not responded. That is, when the other fingers touch or click the screen within the restraining region, the touch or the click is invalid. Therefore, if the undesired operations are caused by the other fingers except for the thumb when the terminal is held by the single hand, the terminal is prevented from responding to the undesired operations.

With the method for restraining edge touches according to embodiments of the present disclosure, by acquiring the locations of the at least two touch points sensed at the restraining edge of the screen, the length of the restraining region is determined according to the maximum distance between the locations of the touch points. Therefore, the location and the size of the restraining region are updated flexibly according to the locations of the touch points, so as to prevent the undesired operations more flexibly.

Further, on the basis of embodiments illustrated as FIG. 1, determining to trigger the touch restraining detection includes followings.

If a signal to unlock the screen is detected, it is determined to trigger the touch restraining detection.

Alternatively, if it is detected that a preset application is started, it is determined to trigger the touch restraining detection.

Alternatively, if an instruction to start the touch restraining detection is received, it is determined to trigger the touch restraining detection.

In one or more embodiments, only when conditions to trigger the touch restraining detection are satisfied, the touching restraining detection is triggered by the terminal. For example, when the screen of the terminal is locked, the touch restraining detection is not triggered. When the signal to unlock the screen is received, the touch restraining detection is triggered. Alternatively, when a preset application, such as a message application a social network application, a shopping application, a chatting application, or the like, is started, the touch restraining detection is triggered. When another application which is not the preset application is started, the touch restraining detection is not triggered. Alternatively, when it is required to start the touch restraining detection for the user, by sending the instruction to start the touch restraining detection to the terminal, for example by words, special keys, special patterns, voices and the like, the touch restraining detection is triggered.

With the method for restraining edge touches according to embodiments of the present disclosure, when the signal to unlock the screen is detected, or it is detected that the preset application is started, or the instruction to start the touch restraining detection is received, it is determined to trigger the touch restraining detection. Only when the conditions to trigger the touch restraining detection are satisfied, the terminal triggers the touch restraining detection. Therefore, it avoids extra power consumption result from unnecessary touch restraining detections, and furthermore loads of a processor of the terminal may be alleviated.

Further, on the basis of embodiments illustrated as FIG. 1, the method for restraining edge touches may further include followings. When it is determined to end the touch restraining detection, the restraining region is disabled, such that the touch points sensed in the restraining region trigger the terminal to respond to the operations input by the user.

In an alternative embodiment, determining to end the touch restraining detection includes followings.

If it is detected that the holding manner is not the single-hand holding manner, it is determined to end the touch restraining detection.

Alternatively, if the signal to lock the screen is detected, it is determined to end the touch restraining detection.

Alternatively, if it is determined that the preset application is closed, it is determined to end the touch restraining detection.

Alternatively, if the instruction to end the touch restraining detection is received, it is determined to end the touch restraining detection.

In an embodiment, it is required to end the touch restraining detection in some cases. The restraining region is disabled such that the terminal may respond to the touch points sensed in the screen anywhere. For example, when it is detected that the terminal is not held by the single-hand holding manner, such as the terminal is held by two hands or the terminal is placed fixedly, it is determined to end the touch restraining detection. Alternatively, when the signal to lock the screen is detected, for example the screen of the terminal is locked when the terminal is standby or in a preset mode for saving power, it is determined to end the touch restraining detection. Alternatively, when it is detected that the preset application, such as a message application, a social network application, a shopping application, a chatting application, or the like, is closed, it is determined to end the touch restraining detection. Alternatively, when the touch restrained detection is not required for the user, by sending the instruction to end the touch restraining detection to the terminal, it is determined to end the touch restraining detection.

With the method for restraining edge touches according to embodiments of the present disclosure, when it is detected that the holding manner is not the single-hand holding manner, or the signal to end the touch restraining detection is detected, or it is detected that the preset application is closed, or the instruction to end the touch restraining detection is received, the touch restraining detection is ended on time. Therefore, it is ensured that the operations input by the user may be responded in any region in the screen. Furthermore, by ending the touch restraining detection on time, the power consumption of the terminal may be reduced and the loads of the processor of the terminal may be alleviated.

Figure 6:
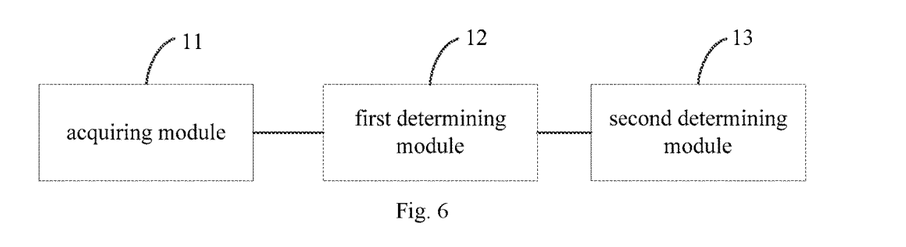
FIG. 6 is a block diagram illustrating a device for restraining edge touches according to an aspect of the disclosure.

FIG. 6 is a block diagram illustrating a device for restraining edge touches according to an aspect of the disclosure. As illustrated in FIG. 6, the device includes an acquiring module 11, a first determining module 12 and a second determining module 13.

The acquiring module 11 is configured to, when it is determined to trigger a touch restraining detection, acquire locations of one or more touch points sensed by a terminal at two edges of a screen of the terminal.

The first determining module 12 is configured to determine a holding manner indicating how the terminal is held according to the locations of the one or more touch points.

The second determining module 13 is configured to, when it is determined that the holding manner is a single-hand holding manner indicating that the terminal is held by a single hand, determine a restraining region at one edge of the screen corresponding to the single-hand holding manner, such that touch points sensed within the restraining region do not trigger the terminal to respond to operations input by a user.

Regarding to the device described in above embodiments, detailed operation manners of each module has been described in detail in corresponding method embodiments, which is not elaborated herein.

Figure 7:
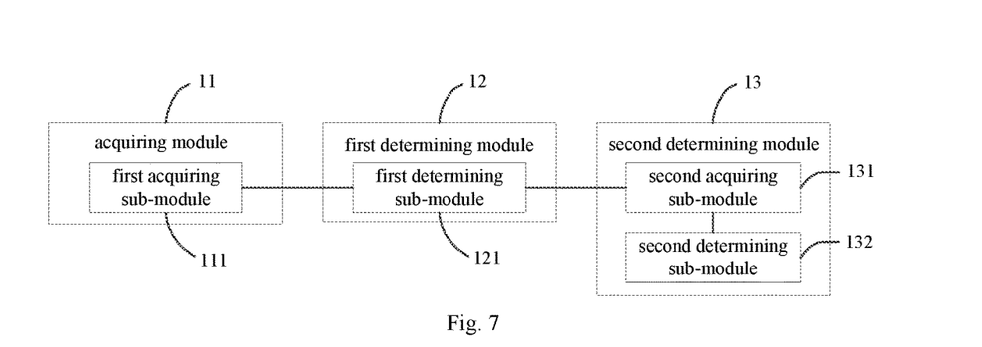
FIG. 7 is a block diagram illustrating a device for restraining edge touches according to another aspect of the disclosure.

FIG. 7 is a block diagram illustrating a device for restraining edge touches according to another aspect of the disclosure. As illustrated in FIG. 7, the acquiring module 11 includes a first acquiring sub-module 111.

The first acquiring sub-module 111 is configured to sense the locations of the one or more touch points at the two edges of the screen via temperature sensors arranged at the two edges of the screen.

In an alternative embodiment, as illustrated in FIG. 7, the first determining module 12 includes a first determining sub-module 121.

The first determining sub-module 121 is configured to, if one touch point is sensed at a first edge of the screen and at least two touch points are sensed at a second edge of the screen, determine the holding manner as the single-hand holding manner.

In an alternative embodiment, as illustrated in FIG. 7, the second determining module 13 includes a second acquiring sub-module 131 and a second determining module 132.

The second acquiring sub-module 131 is configured to acquire locations of touch points sensed at a restraining edge of the screen. At least touch points are sensed at the restraining edge of the screen.

The second determining sub-module 132 is configured to determine a length of the restraining region according to a maximum distance between the locations of the touch points sensed at the restraining edge of the screen.

Regarding to the device described in above embodiments, detailed operation manners of each module has been described in detail in corresponding method embodiments, which is not elaborated herein.

Figure 8:
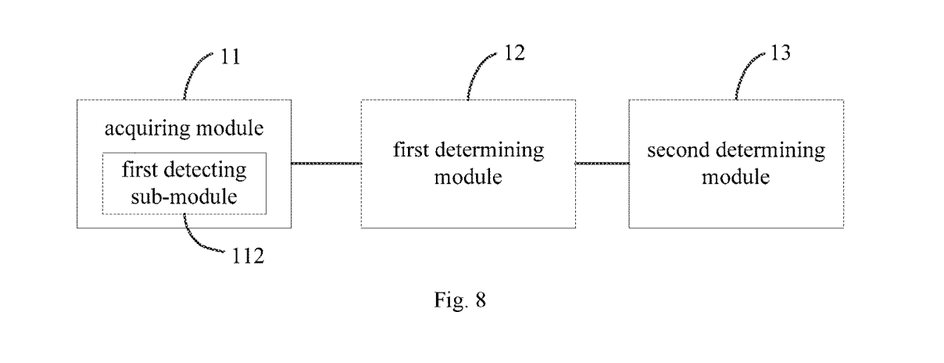
FIG. 8 is a block diagram illustrating a device for restraining edge touches according to still another aspect of the disclosure.
Figure 9:
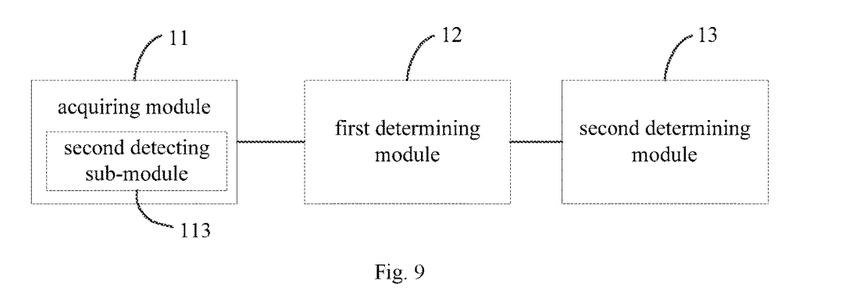
FIG. 9 is a block diagram illustrating a device for restraining edge touches according to still another aspect of the disclosure.
Figure 10:
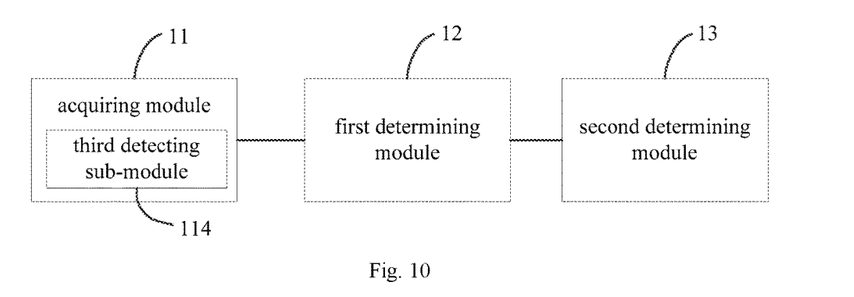
FIG. 10 is a block diagram illustrating a device for restraining edge touches according to still another aspect of the disclosure.

FIGS. 8 to 10 illustrate the acquiring module 11. In an alternative embodiment, the acquiring module 11 includes a first detecting 112. In an alternative embodiment, the acquiring module 11 includes a second detecting sub-module 113.

In an alternative embodiment, the acquiring module 11 includes a third detecting sub-module 114.

The first detecting sub-module 112 is configured to, if a signal to unlock the screen is detected, determine to trigger the touch restraining detection.

The second detecting sub-module 113 is configured to, if it is detected that a preset application is started, determine to trigger the touch restraining detection.

The third detecting sub-module 114 is configured to, if an instruction to start the touch restraining detection is received, determine to trigger the touch restraining detection.

Regarding to the device described in above embodiments, detailed operation manners of each module has been described in detail in corresponding method embodiments, which is not elaborated herein.

Figure 11:
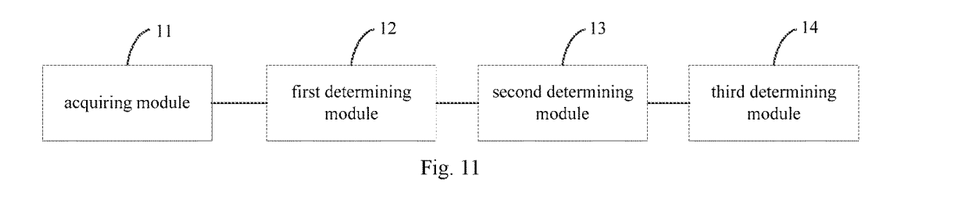
FIG. 11 is a block diagram illustrating a device for restraining edge touches according to still another aspect of the disclosure.

FIG. 11 is a block diagram illustrating a device for restraining edge touches according to still another aspect of the disclosure. As illustrated in FIG. 11, the device further includes a third determining module 14.

The third determining module 14 is configured to, when it is determined to end the touch restraining detection, disable the restraining region such that the touch points sensed within the restraining region trigger the terminal to respond to the operations input by the user.

FIGS. 12 to 15 illustrate the third determining module 14. In an alternative embodiment, the third determining module 14 includes a fourth detecting sub-module 141. In an alternative embodiment, the third determining module 14 includes a fifth detecting sub-module 142. In an alternative embodiment, the third determining module 14 includes a sixth detecting sub-module 143. In an alternative embodiment, the third determining module 14 includes a seventh detecting sub-module 144.

Figure 12:
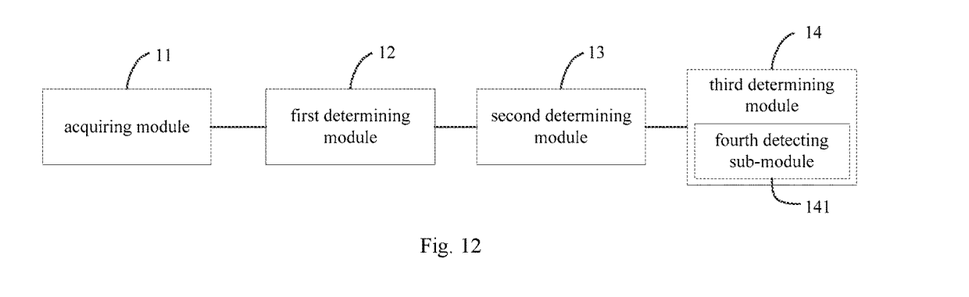
FIG. 12 is a block diagram illustrating a device for restraining edge touches according to still another aspect of the disclosure.

The fourth detecting sub-module 141 is configured to, if it is detected that the holding manner is not the single-hand holding manner, determine to end the touch restraining detection.

Figure 13:
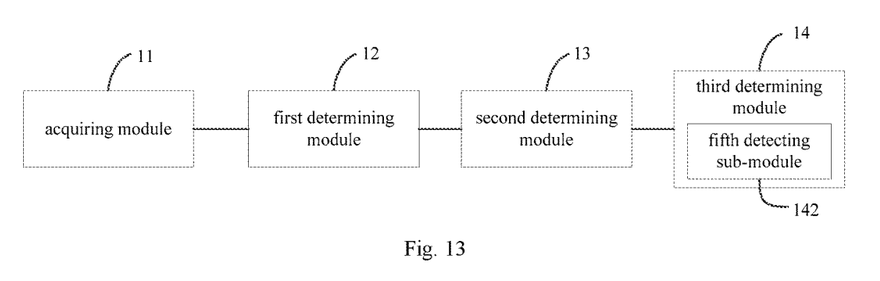
FIG. 13 is a block diagram illustrating a device for restraining edge touches according to still another aspect of the disclosure.

The fifth detecting sub-module 142 is configured to, if a signal to lock the screen is detected, determine to end the touch restraining detection.

Figure 14:
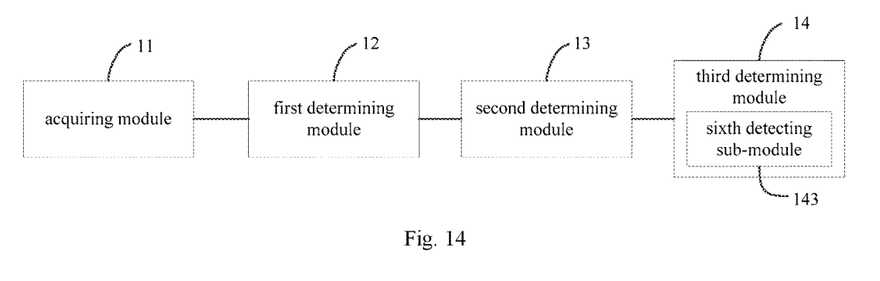
FIG. 14 is a block diagram illustrating a device for restraining edge touches according to still another aspect of the disclosure.

The sixth detecting sub-module 143 is configured to, if it is detected that a preset application is closed, determine to end the touch restraining detection.

Figure 15:
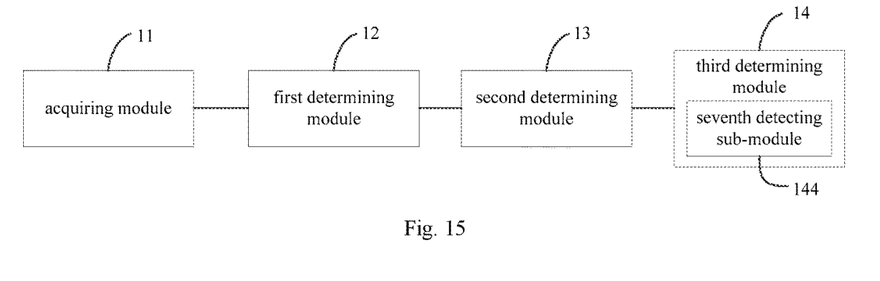
FIG. 15 is a block diagram illustrating a device for restraining edge touches according to still another aspect of the disclosure.

The seventh detecting sub-module 144 is configured to, if an instruction to end the touch restraining detection is received, determine to end the touch restraining detection.

Regarding to the device described in above embodiments, detailed operation manners of each module has been described in detail in corresponding method embodiments, which is not elaborated herein.

Figure 16:
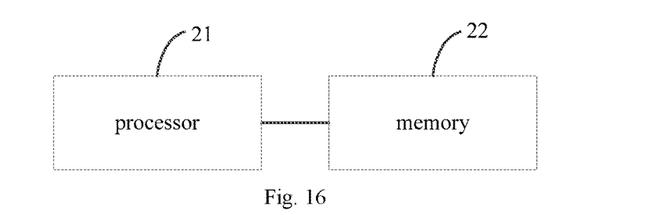
FIG. 16 is a block diagram illustrating a device for restraining edge touches according to yet another aspect of the disclosure.

FIG. 16 is a block diagram illustrating a device for restraining edge touches according to yet another aspect of the disclosure. As illustrated in FIG. 16, the device includes a processor 12, and a memory 22.

The memory 22 is configured to store an instruction executable by the processor 21.

The processor 21 is configured to when determining to trigger a touch restraining detection, acquire locations of one or more touch points sensed by a terminal at two edges of a screen of the terminal; to determine a holding manner indicating how the terminal is held according to the locations of the one or more touch points; and when the holding manner is a single-hand holding manner indicating that the terminal is held by a single hand, to determine a restraining region at one edge of the screen corresponding to the single-hand holding manner, such that touch points sensed in the restraining region do not trigger the terminal to respond to operations input by a user.

Regarding to the device described in above embodiments, detailed operation manners of each module has been described in detail in corresponding method embodiments, which is not elaborated herein.

Figure 17:
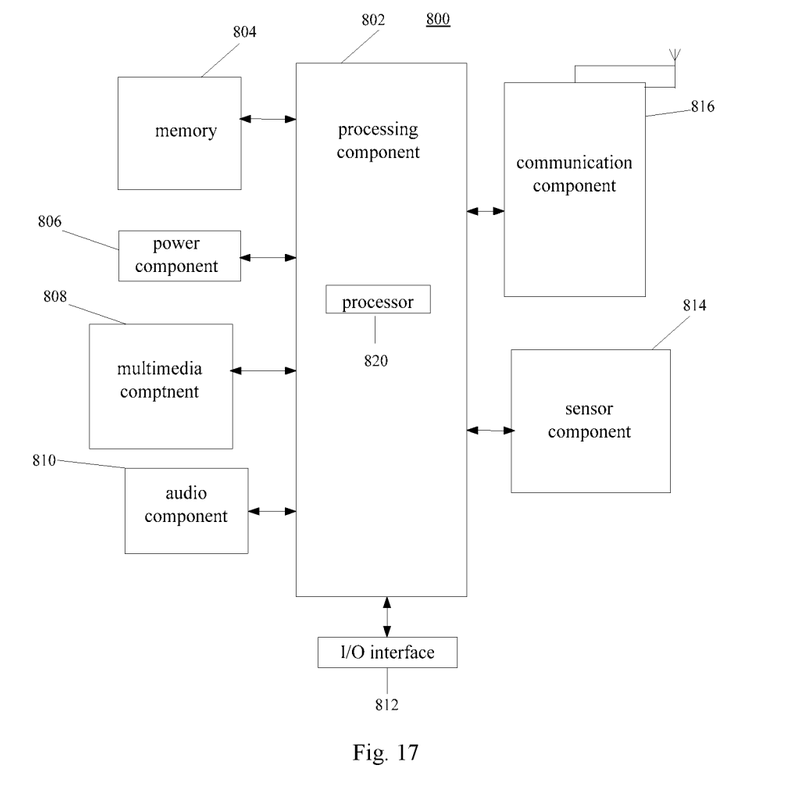
FIG. 17 is a block diagram illustrating an apparatus for restraining edge touches according to an aspect of the disclosure.

FIG. 17 is a block diagram illustrating an apparatus for restraining edge touches according to an aspect of the disclosure. For example, the apparatus 800 may be a mobile phone, a computer, a digital broadcasting terminal, a messaging device, a game console, a tablet device, a medical device, fitness equipment, a Personal Digital Assistant PDA, and the like.

Referring to FIG. 17, the apparatus 800 may include the following one or more components: a processing component 802, a memory 804, a power component 806, a multimedia component 808, an audio component 810, an Input/Output (I/O) interface 812, a sensor component 814, and a communication component 816.

The processing component 802 typically controls overall operations of the apparatus 800, such as the operations associated with display, telephone calls, data communications, camera operations, and recording operations. The processing component 802 may include one or more processors 820 to execute instructions to perform all or part of the acts in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the apparatus 800. Examples of such data include instructions for any applications or methods operated on the apparatus 800, contact data, phone-book data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the apparatus 800. The power component 806 may include a power management system, one or more power sources, and any other components associated with the generation, management, and distribution of power in the apparatus 800.

The multimedia component 808 includes a screen providing an output interface between the apparatus 800 and the user. In some embodiments, the screen may include a liquid crystal display (LCD) and a press panel (TP). If the screen includes the touchable panel, the screen may be implemented as a touch screen to receive input signals from the user. The touchable panel includes one or more touch sensors to sense touches, swipes, and other gestures on the touchable panel. The touch sensors may not only sense a boundary of a touch or swipe action, but also sense a duration time and a pressure associated with the touch or swipe action. In some embodiments, the multimedia component 808 includes a front camera and/or a rear camera. The front camera and/or the rear camera may receive external multimedia data while the apparatus 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone (MIC) configured to receive an external audio signal when the apparatus 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface for the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the apparatus 800. For instance, the sensor component 814 may detect an open/closed status of the apparatus 800 and relative positioning of components (e.g. the display and the keypad of the apparatus 800). The sensor component 814 may also detect a change in position of the apparatus 800 or of a component in the apparatus 800, a presence or absence of user contact with the apparatus 800, an orientation or an acceleration/deceleration of the apparatus 800, and a change in temperature of the apparatus 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate wired or wireless communication between the apparatus 800 and other apparatuses. The apparatus 800 can access a wireless network based on a communication standard, such as WIFI, 2G, or 3G, or a combination thereof. In one aspect of the disclosure, the communication component 816 receives a broadcast signal or broadcast associated information from an external broadcast management system via a broadcast channel. In one aspect of the disclosure, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In aspect of the disclosures, the apparatus 800 may be implemented with one or more circuitry, which include application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The apparatus 800 may use the circuitry in combination with the other hardware or software components for performing the above described methods. Each module, sub-module, unit, or sub-unit in the disclosure may be implemented at least partially using the one or more circuitry.

In aspect of the disclosures, there is also provided a non-transitory computer readable storage medium having instructions, such as the memory 804 including instructions. The instructions may be executed by the processors 820 of the apparatus 800 to perform the above method for restraining edge touches. For example, the non-transitory computer-readable storage medium may be a ROM, a RAM, a CD-ROM, a magnetic tape, a floppy disc, an optical data storage device, and the like.

There is provided a non-transitory computer readable storage medium, when instructions stored therein are executed by a processor of a mobile terminal, causing the mobile terminal to perform a method for restraining edge touches. The method includes following.

When determining to trigger a touch restraining detection, locations of one or more touch points sensed by a terminal at two edges of a screen of the terminal are acquired.

A holding manner indicating how the terminal is held is determined according to the locations of the one or more touch points.

When the holding manner is a single-hand holding manner indicating that the terminal is held by a single hand, a restraining region is determined at one edge of the screen corresponding to the single-hand holding manner, such that touch points sensed within the restraining region do not trigger the terminal to respond to operations input by a user.

In an embodiment, acquiring the locations of the one or more touch points sensed by the terminal at two edges of the screen of the terminal includes followings.

The locations of the one or more touch points at the two edges of the screen are sensed via temperature sensors arranged at the two edges of the screen.

In an embodiment, determining the holding manner according to the locations of the one or more touch points includes followings.

If one touch point is sensed at a first edge of the screen and at least two touch points are sensed at a second edge of the screen, it is determined that the holding manner is the single-hand holding manner.

In an embodiment, determining the restraining region at one edge of the screen corresponding to the single-hand holding manner includes followings.

Locations of touch points sensed at a restraining edge of the screen are acquired. At least two touch points are sensed at the restraining edge of the screen.

A length of the restraining region is determined according to a maximum distance between the locations of the touch points sensed at the restraining edge of the screen.

In an embodiment, determining to trigger the touch restraining detection includes followings.

If detecting a signal to unlock the screen, it is determined to trigger the touch restraining detection; or Alternatively, if detecting that a preset application is started, it is determined to trigger the touch restraining detection; or Alternatively, if receiving an instruction to start the touch restraining detection, it is determined to trigger the touch restraining detection.

In an embodiment, the method further includes followings.

When determining to end the touch restraining detection, the restraining region is disabled such that the touch points sensed within the restraining region trigger the terminal to respond to the operations input by the user.

In an embodiment, determining to end the touch restraining detection includes followings.

When detecting that the holding manner is not the single-hand holding manner, it is determined to end the touch restraining detection.

Alternatively, when detecting a signal to lock the screen, it is determined to end the touch restraining detection.

Alternatively, when detecting that a preset application is closed, it is determined to end the touch restraining detection.

Alternatively, when receiving an instruction to end the touch restraining detection, it is determined to end the touch restraining detection.

The terminology used in the present disclosure is for the purpose of describing exemplary embodiments only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It is to be understood that, the present disclosure is not limited to the exact construction that has been described above and illustrated in the accompanying drawings, and that various modifications and changes can be made without departing form the scope thereof. It is intended that the scope of the disclosure only be limited by the appended claims.

What is claimed is:

1. A method for restraining edge touches, comprising:
    when detecting a signal to unlock the screen, triggering a touch restraining detection;
    when detecting that a preset application is started, triggering the touch restraining detection; and
    when receiving an instruction to start the touch restraining detection, triggering the touch restraining detection;
    acquiring locations of one or more touch points sensed by a terminal at two edges of a screen of the terminal;
    determining a holding manner according to the locations of the one or more touch points, the holding manner indicating how the terminal is held; and
    when the holding manner is a single-hand holding manner indicating that the terminal is held by a single hand, determining a restraining region at one edge of the screen corresponding to the single-hand holding manner, such that touch points sensed within the restraining region do not trigger the terminal to respond to operations input by a user.

2. The method according to claim 1, wherein acquiring locations of one or more touch points sensed by the terminal at two edges of the screen of the terminal comprises:
    sensing the locations of the one or more touch points at the two edges of the screen via temperature sensors arranged at the two edges of the screen.

3. The method according to claim 1, wherein determining the holding manner indicating how the terminal is held according to the locations of the one or more touch points comprises:
    when one touch point is sensed at a first edge of the screen and at least two touch points are sensed at a second edge of the screen, determining the holding manner as the single-hand holding manner.

4. The method according to claim 1, wherein determining the restraining region at one edge of the screen corresponding to the single-hand holding manner comprises:
    acquiring locations of touch points sensed at a restraining edge of the screen, wherein at least two touch points are sensed at the restraining edge of the screen; and
    determining a length of the restraining region according to a maximum distance between the locations of the touch points sensed at the restraining edge of the screen.

5. The method according to claim 1, further comprising:
    when determining to end the touch restraining detection, disabling the restraining region such that the touch points sensed within the restraining region trigger the terminal to respond to the operations input by the user.

6. The method according to claim 5, wherein determining to end the touch restraining detection comprises at least one of the following:
    when detecting that the holding manner is not the single-hand holding manner, determining to end the touch restraining detection;
    when detecting a signal to lock the screen, determining to end the touch restraining detection;
    when detecting that a preset application is closed, determining to end the touch restraining detection; and
    when receiving an instruction to end the touch restraining detection, determining to end the touch restraining detection.

7. A device for restraining edge touches, comprising:
    a processor; and
    a memory configured to store an instruction executable by the processor;
    wherein the processor is configured to:
    when detecting a signal to unlock the screen, trigger a touch restraining detection;
    when detecting that a preset application is started, trigger the touch restraining detection; and when receiving an instruction to start the touch restraining detection, trigger the touch restraining detection;

acquire locations of one or more touch points sensed by a terminal at two edges of a screen of the terminal;

determine a holding manner according to the locations of the one or more touch points, the holding manner indicating how the terminal is held; and when the holding manner is a single-hand holding manner indicating that the terminal is held by a single hand, determine a restraining region at one edge of the screen corresponding to the single-hand holding manner, such that touch points sensed within the restraining region are treated differently compared to touch points sensed within regions other than the restraining region.

8. The device according to claim 7, wherein the processor is configured to acquire locations of one or more touch points sensed by the terminal at two edges of the screen of the terminal by an act of:

obtaining the locations of the one or more touch points at the two edges of the screen via temperature sensors arranged at the two edges of the screen.

9. The device according to claim 7, wherein the processor is configured to determine the holding manner indicating how the terminal is held according to the locations of the one or more touch points by an act of:

when one touch point is sensed at a first edge of the screen and at least two touch points are sensed at a second edge of the screen, determining the holding manner as the single-hand holding manner.

10. The device according to claim 7, wherein the processor is configured to determine the restraining region at one edge of the screen corresponding to the single-hand holding manner by acts of:

acquiring locations of touch points sensed at a restraining edge of the screen, wherein at least two touch points are sensed at the restraining edge of the screen; and determining a length of the restraining region according to a maximum distance between the locations of the touch points sensed at the restraining edge of the screen.

11. The device according to claim 7, wherein the processor is further configured to:

when determining to end the touch restraining detection, disable the restraining region such that the touch points sensed within the restraining region trigger the terminal to respond to operations input by a user.

12. The device according to claim 11, wherein the processor is configured to determine to end the touch restraining detection by performing:

when detecting that the holding manner is not the single-hand holding manner, determining to end the touch restraining detection;

when detecting a signal to lock the screen, determining to end the touch restraining detection;

when detecting that a preset application is closed, determining to end the touch restraining detection; and when receiving an instruction to end the touch restraining detection, determining to end the touch restraining detection.

13. A non-transitory computer-readable storage medium having stored therein instructions that, when executed by a processor of a terminal, causes the terminal to perform acts comprising:

when detecting a signal to unlock the screen, triggering a touch restraining detection;

when detecting that a preset application is started, triggering the touch restraining detection; and when receiving an instruction to start the touch restraining detection, triggering the touch restraining detection;

acquiring locations of one or more touch points sensed by a terminal at two edges of a screen of the terminal;

determining a holding manner according to the locations of the one or more touch points, the holding manner indicating how the terminal is held; and when the holding manner is a single-hand holding manner indicating that the terminal is held by a single hand, determining a restraining region at one edge of the screen corresponding to the single-hand holding manner, such that touch points sensed within the restraining region do not trigger the terminal to respond to operations input by a user.

14. The non-transitory computer-readable storage medium according to claim 13, wherein acquiring locations of one or more touch points sensed by the terminal at two edges of the screen of the terminal comprises:

sensing the locations of the one or more touch points at the two edges of the screen via temperature sensors arranged at the two edges of the screen.

15. The non-transitory computer-readable storage medium according to claim 13, wherein determining the holding manner indicating how the terminal is held according to the locations of the one or more touch points comprises:

when one touch point is sensed at a first edge of the screen and at least two touch points are sensed at a second edge of the screen, determining the holding manner as the single-hand holding manner.

16. The non-transitory computer-readable storage medium according to claim 13, wherein determining the restraining region at one edge of the screen corresponding to the single-hand holding manner comprises:

acquiring locations of touch points sensed at a restraining edge of the screen, wherein at least two touch points are sensed at the restraining edge of the screen; and determining a length of the restraining region according to a maximum distance between the locations of the touch points sensed at the restraining edge of the screen.

17. The non-transitory computer-readable storage medium according to claim 13, wherein the acts further comprise:

when determining to end the touch restraining detection, disabling the restraining region such that the touch points sensed within the restraining region trigger the terminal to respond to the operations input by the user.

* * * * *